(12) United States Patent
Kumazawa

(10) Patent No.: US 10,864,914 B2
(45) Date of Patent: Dec. 15, 2020

(54) CONTROL DEVICE OF VEHICLE

(71) Applicant: TOYOTA JIDOSHA KABUSHIKI KAISHA, Toyota (JP)

(72) Inventor: Takuma Kumazawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 16/405,379

(22) Filed: May 7, 2019

(65) Prior Publication Data

US 2019/0337516 A1 Nov. 7, 2019

(30) Foreign Application Priority Data

May 7, 2018 (JP) .................. 2018-089548

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC .......... B60W 30/18072; B60W 10/02; B60W 10/06; B60W 10/08; B60W 10/30; B60W 2030/1809; B60W 2510/305; B60W 2520/10; B60W 2710/06; B60W 2710/10; B60W 20/40; B60W 2540/12; B60W 2030/18081; B60W 2510/0638; B60W 2510/081; B60W 2540/10; H02J 1/1446; H02J 2310/46; H02J 7/1446; B60K 6/485; Y02T 10/60; Y02T 10/62
See application file for complete search history.

(56) References Cited

U.S. PATENT DOCUMENTS 9,540,004 B2 * 1/2017 Kim ................ B60W 30/18072
9,598,082 B2 * 3/2017 Kuroki .................. B60W 10/02
(Continued)

FOREIGN PATENT DOCUMENTS

| JP | 2015-058783 A | 3/2015 |
| JP | 2016-020188 A | 2/2016 |
| JP | 2016-182871 A | 10/2016 |

*Primary Examiner* — Tinh Dang
(74) *Attorney, Agent, or Firm* — Oliff PLC

(57) ABSTRACT

A control device of a vehicle including an engine, an auxiliary machine driven by rotation of the engine, and an engagement device selectively connecting and disconnecting a power transmission path between the engine and drive wheels comprises: a coasting control portion for selectively providing a first coasting control for allowing the vehicle to coast with the engine brought into a drive state while the power transmission path is disconnected by release of the engagement device, and a second coasting control for allowing the vehicle to coast with the engine brought into a stop state while the power transmission path is connected. If a load of the auxiliary machine is equal to or greater than a predetermined load and a vehicle speed is equal to or greater than a predetermined vehicle speed when a predetermined coasting start condition is satisfied, the coasting control portion provides the first coasting control.

8 Claims, 9 Drawing Sheets

(51) Int. Cl.
*B60W 10/30* (2006.01)
*B60W 10/06* (2006.01)
*B60W 10/08* (2006.01)
*B60K 6/485* (2007.10)
*H02J 7/14* (2006.01)
*H02J 1/14* (2006.01)

(52) U.S. Cl.
CPC ........... *B60W 10/30* (2013.01); *H02J 7/1446* (2013.01); *B60W 2030/1809* (2013.01); *B60W 2510/305* (2013.01); *B60W 2520/10* (2013.01); *B60W 2710/06* (2013.01); *B60W 2710/10* (2013.01)

(56) References Cited

U.S. PATENT DOCUMENTS

| | | | | |
|---|---|---|---|---|
| 9,771,077 | B2* | 9/2017 | Fujita | B60W 50/10 |
| 10,457,285 | B2* | 10/2019 | Maeda | B60T 8/17 |
| 10,712,741 | B2* | 7/2020 | Endo | B60W 20/00 |
| 2015/0353086 | A1* | 12/2015 | Kato | B60W 10/08 |
| | | | | 701/70 |
| 2016/0017825 | A1* | 1/2016 | Maeda | B60W 10/06 |
| | | | | 701/58 |

* cited by examiner

FIG.6

|  |  | COMPRESSOR LOAD | | |
|---|---|---|---|---|
|  |  | LOW | MEDIUM | HIGH |
| COASTING START VEHICLE SPEED | LOW | REGENERATIVE CONTROL (ENGINE-BRAKE COASTING) | REGENERATIVE CONTROL (ENGINE-BRAKE COASTING) | REGENERATIVE CONTROL (ENGINE-BRAKE COASTING) |
| | MEDIUM | ELECTRIC-POWER-GENERATION-SUPPRESSED COASTING | ELECTRIC-POWER-GENERATION-SUPPRESSED COASTING | IDLE COASTING |
| | HIGH | IDLE COASTING OR ELECTRIC-POWER-GENERATION-SUPPRESSED COASTING | IDLE COASTING | IDLE COASTING |

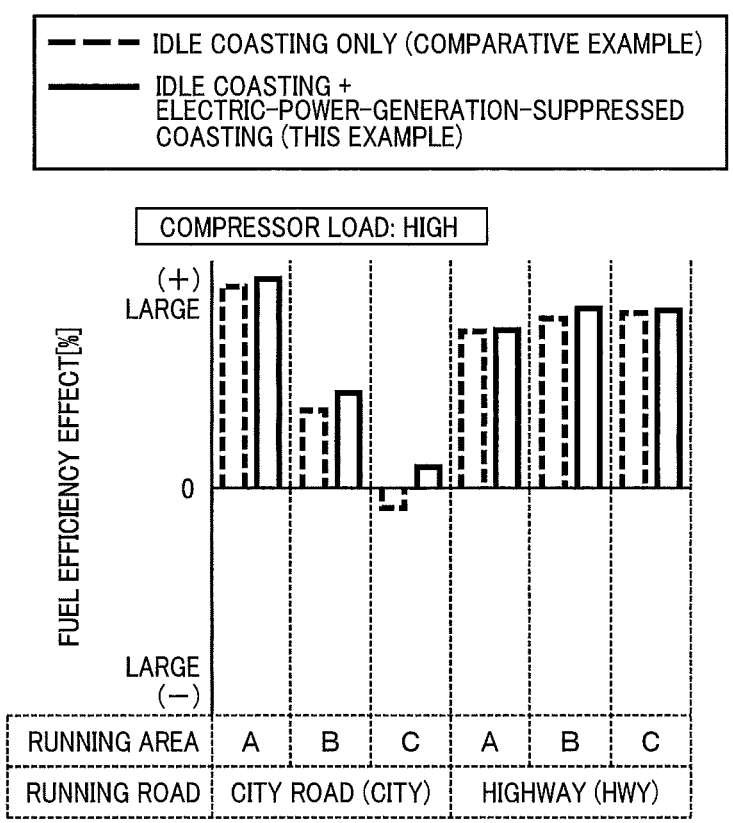

CONTROL DEVICE OF VEHICLE

This application claims priority from Japanese Patent Application No. 2018-089548 filed on May 7, 2018, the disclosure of which is herein incorporated by reference in its entirety.

FIELD OF THE INVENTION

The present invention relates to a control device of a vehicle configured to provide a coasting control for allowing the vehicle to coast.

DESCRIPTION OF THE RELATED ART

There is well known a control device of a vehicle including an engine, an auxiliary machine driven by rotation of the engine, and an engagement device selectively connecting and disconnecting a power transmission path between the engine and drive wheels. For example, this corresponds to a vehicle control device described in Patent Document 1. Patent Document 1 discloses that a fuel consumption amount is reduced by providing a coasting control for allowing a vehicle to coast with the power transmission path between the engine and the drive wheels disconnected by releasing the engagement device, when a coasting control start condition is satisfied.

PRIOR ART DOCUMENT

Patent Document

Patent Document 1: Japanese Laid-Open Patent Publication No. 2016-182871

SUMMARY OF THE INVENTION

Technical Problem

It is conceivable that a fuel consumption amount is reduced by allowing the vehicle to coast with the engine brought into a stop state by fuel cut while the power transmission path between the engine and the drive wheels is kept connected. In a first coasting control for allowing the vehicle to coast with the engine brought into a drive state while the power transmission path is disconnected by release of the engagement device, no engine brake etc. are applied, so that a deceleration of the vehicle is reduced, which extends a distance of coasting running; however, a certain amount of the fuel is required for maintaining the engine at an idle rotation speed, for example. On the other hand, in a second coasting control for allowing the vehicle to coast with the engine brought into a stop state while the power transmission path is connected, the distance of coasting running is made shorter than the first coasting control due to the engine brake etc.; however, a fuel consumption amount can be reduced by fuel cut during coasting running. It is desirable to select one coasting control producing a larger fuel efficiency improvement effect between the first coasting control and the second coasting control.

The present invention was conceived in view of the situations and it is therefore an object of the present invention to provide a control device of a vehicle configured to provide a coasting control having a larger fuel efficiency improvement effect.

Solution to Problem

To achieve the above object, a first aspect of the present invention provides a control device of a vehicle including (a) an engine, an auxiliary machine driven by rotation of the engine, and an engagement device selectively connecting and disconnecting a power transmission path between the engine and drive wheels, the control device comprising: (b) a coasting control portion for selectively providing a first coasting control for allowing the vehicle to coast with the engine brought into a drive state while the power transmission path is disconnected by release of the engagement device, and a second coasting control for allowing the vehicle to coast with the engine brought into a stop state while the power transmission path is connected, wherein (c) if a load of the auxiliary machine is equal to or greater than a predetermined load and a vehicle speed is equal to or greater than a predetermined vehicle speed when a predetermined coasting start condition is satisfied, the coasting control portion provides the first coasting control.

A second aspect of the present invention provides the control device of a vehicle recited in the first aspect of the invention, wherein the vehicle further includes a generator driven by rotation of the engine, wherein the coasting control portion is configured to provide a regenerative control through electric power generation of the generator in the second coasting control, and wherein when the vehicle has at least one of the load of the auxiliary machine less than the predetermined load and the vehicle speed less than the predetermined vehicle speed when the predetermined coasting start condition is satisfied, the coasting control portion provides the second coasting control and suppresses the electric power generation of the generator as compared to the electric power generation by the generator performed at a maximum electric-power-generation voltage.

A third aspect of the present invention provides the control device of a vehicle recited in the second aspect of the invention, wherein the vehicle further includes a battery storing a generated electric power of the generator, wherein the coasting control portion suppresses the electric power generation of the generator by setting an electric power generation amount of the generator to zero when a capacity of the battery is equal to or greater than a predetermined capacity, and suppresses the electric power generation of the generator by performing a constant-voltage electric power generation in which an electric-power-generation voltage of the generator is maintained constant at a predetermined voltage lower than the maximum electric-power-generation voltage when the capacity of the battery is less than the predetermined capacity.

A fourth aspect of the present invention provides the control device of a vehicle recited in the second aspect of the invention, wherein the vehicle further includes a battery storing a generated electric power of the generator, wherein the coasting control portion suppresses the electric power generation of the generator by setting an electric power generation amount of the generator to zero when a fluctuation in voltage of the battery is permitted, and suppresses the electric power generation of the generator by performing a constant-voltage electric power generation in which an electric-power-generation voltage of the generator is maintained constant at a predetermined voltage lower than the maximum electric-power-generation voltage when the fluctuation in voltage of the battery is not permitted.

A fifth aspect of the present invention provides the control device of a vehicle recited in any one of the second to fourth aspects of the invention, wherein when the vehicle speed becomes less than a second predetermined vehicle speed lower than the predetermined vehicle speed during provision of one of the second coasting control with the electric power generation of the electric generator suppressed and the first coasting control, the coasting control portion shifts the control to the second coasting control with the electric-power-generation voltage of the generator set to the maximum electric-power-generation voltage.

A sixth aspect of the present invention provides the control device of a vehicle recited in any one of the second to fifth aspects of the invention, further comprising a deceleration request determining portion determining whether a request for deceleration of the vehicle is large or small when the predetermined coasting start condition is satisfied, wherein when it is determined that the request for deceleration is small, the coasting control portion provides the first coasting control or the second coasting control with the electric power generation of the electric generator suppressed.

A seventh aspect of the present invention provides the control device of a vehicle recited in the sixth aspect of the invention, wherein if it is determined that the request for deceleration is large, the coasting control portion provides the second coasting control and provides the regenerative control at the maximum electric-power-generation voltage.

An eighth aspect of the present invention provides the control device of a vehicle recited in any one of the first to sixth aspects of the invention, wherein the auxiliary machine is a compressor for an air conditioner.

Advantageous Effects of Invention

The control device recited in the first aspect of the invention provides the first coasting control if the load of the auxiliary machine is equal to or greater than the predetermined load and the vehicle speed is equal to or greater than the predetermined vehicle speed when the predetermined coasting start condition is satisfied, so that the large fuel efficiency improvement effect can be expected. In other words, when the load of the auxiliary machine is relatively high, a large reduction amount of the deceleration of the vehicle can be expected from disconnection of the power transmission path between the engine and the drive wheels. If the vehicle speed is high and the reduction amount of the deceleration is large, a long coasting running distance of the vehicle can be expected. From the above, the large fuel efficiency improvement effect can be expected from the provision of the first coasting control. Therefore, the coasting control having the larger fuel efficiency improvement effect can be provided.

The control device recited in the second aspect of the invention provides the second coasting control when the vehicle has at least one of the load of the auxiliary machine less than the predetermined load and the vehicle speed less than the predetermined vehicle speed when the predetermined coasting start condition is satisfied, wherein when the second coasting control is provided, the electric power generation of the generator is suppressed as compared to a case where the electric power generation by the generator is performed at a maximum electric-power-generation voltage. Therefore, the fuel efficiency improvement effect can be expected in the region where the fuel efficiency improvement effect is less expected from the provision of the first coasting control. In other words, the electric power generation of the generator is suppressed in the second coasting control, so that the deceleration is reduced and the fuel efficiency improvement effect can be expected. Therefore, the coasting control having the larger fuel efficiency improvement effect can be provided.

The control device recited in the third aspect of the invention suppresses the electric power generation of the generator by setting the electric power generation amount of the generator to zero when the capacity of the battery is equal to or greater than the predetermined capacity, and on the other hand, suppresses the electric power generation of the generator by performing the constant-voltage electric power generation when the capacity of the battery is less than the predetermined capacity, so that the second coasting control with the electric power generation suppressed may properly be provided.

The control device recited in the fourth aspect of the invention suppresses the electric power generation of the generator by setting the electric power generation amount of the generator to zero when the fluctuation in voltage of the battery is permitted, and on the other hand, suppresses the electric power generation of the generator by performing the constant-voltage electric power generation when the fluctuation in voltage of the battery is not permitted, so that the second coasting control with the electric power generation suppressed may properly be provided.

The control device recited in the fifth aspect of the invention shifts the control to the second coasting control when the vehicle speed becomes less than the second predetermined vehicle speed during the provision of the second coasting control with the electric power generation of the generator suppressed and the first coasting control, the shifted second coasting control setting the electric-power-generation voltage of the generator to the maximum electric-power-generation voltage, so that the deceleration is properly increased in the low vehicle speed region where the request for deceleration is expected to be relatively larger.

The control device recited in the sixth aspect of the invention provides the first coasting control or the second coasting control with the electric power generation of the generator suppressed when the predetermined coasting start condition is satisfied and it is determined that the request for deceleration is relatively small, so that a discomfort feeling due to reduction in deceleration is hardly caused for a driver.

The control device recited in the seventh aspect of the invention provides the second coasting control if it is determined that the request for deceleration is relatively large when the predetermined coasting start condition is satisfied, the provided second coasting control setting the electric-power-generation voltage of the generator to the maximum electric-power-generation voltage, so that when the coasting control reducing the deceleration should not be provided, the coasting control resulting in a relatively large deceleration is properly provided.

According to the eighth aspect of the invention, the auxiliary machine is a compressor for an air condition. While the compressor load is not constant, the coasting control having the larger fuel efficiency improvement effect can be provided depending on the compressor load.

BRIEF DESCRIPTION OF DRAWINGS

FIG. 4 shows the case of relatively high compressor load.

FIG. 5 shows the case of relatively low compressor load.

FIG. 6 is a diagram showing the coasting control suitable for each state of the compressor load and a coasting start vehicle speed.

FIG. 9 shows the case of the low compressor load.

FIG. 10 shows the case of the medium compressor load.

FIG. 11 is a diagram showing a result of verification of the fuel efficiency improvement effect in the present example. FIG. 11 shows the case of the high compressor load.

MODES FOR CARRYING OUT THE INVENTION

In an embodiment of the present invention, the vehicle includes a transmission constituting a portion of the power transmission path between the engine and the drive wheels. For example, the transmission is a known planetary gear type automatic transmission, a known synchronous meshing type parallel two-shaft manual transmission, a known synchronous meshing type parallel two-shaft automatic transmission, a known DCT (Dual Clutch Transmission) that is a type of a synchronous meshing type parallel two-shaft automatic transmission including two systems of input shafts, a known belt type or toroidal type continuously variable transmission, etc. In a broad sense, the belt type continuously variable transmission may include a chain type continuously variable transmission For example, a friction engagement device is used for the engagement device. If the vehicle includes the planetary gear type automatic transmission, the engagement device is a friction engagement type clutch or a brake included in the automatic transmission, for example, and during the coasting control for allowing the vehicle to coast, the automatic transmission is brought into a neutral state by releasing the engagement device engaged for forming a gear position of the automatic transmission. If the vehicle includes a synchronous meshing type parallel two-shaft type transmission or a continuously variable transmission, the engagement device is a friction engagement type clutch disposed in the power transmission path, for example, and during the coasting control for allowing the vehicle to coast, the clutch is automatically released by a command from the control device.

The engine may be an internal combustion engine such as a gasoline engine and a diesel engine generating power from combustion of fuel, for example.

An example of the present invention will now be described in detail with reference to the drawings.

EXAMPLE

Figure 1:
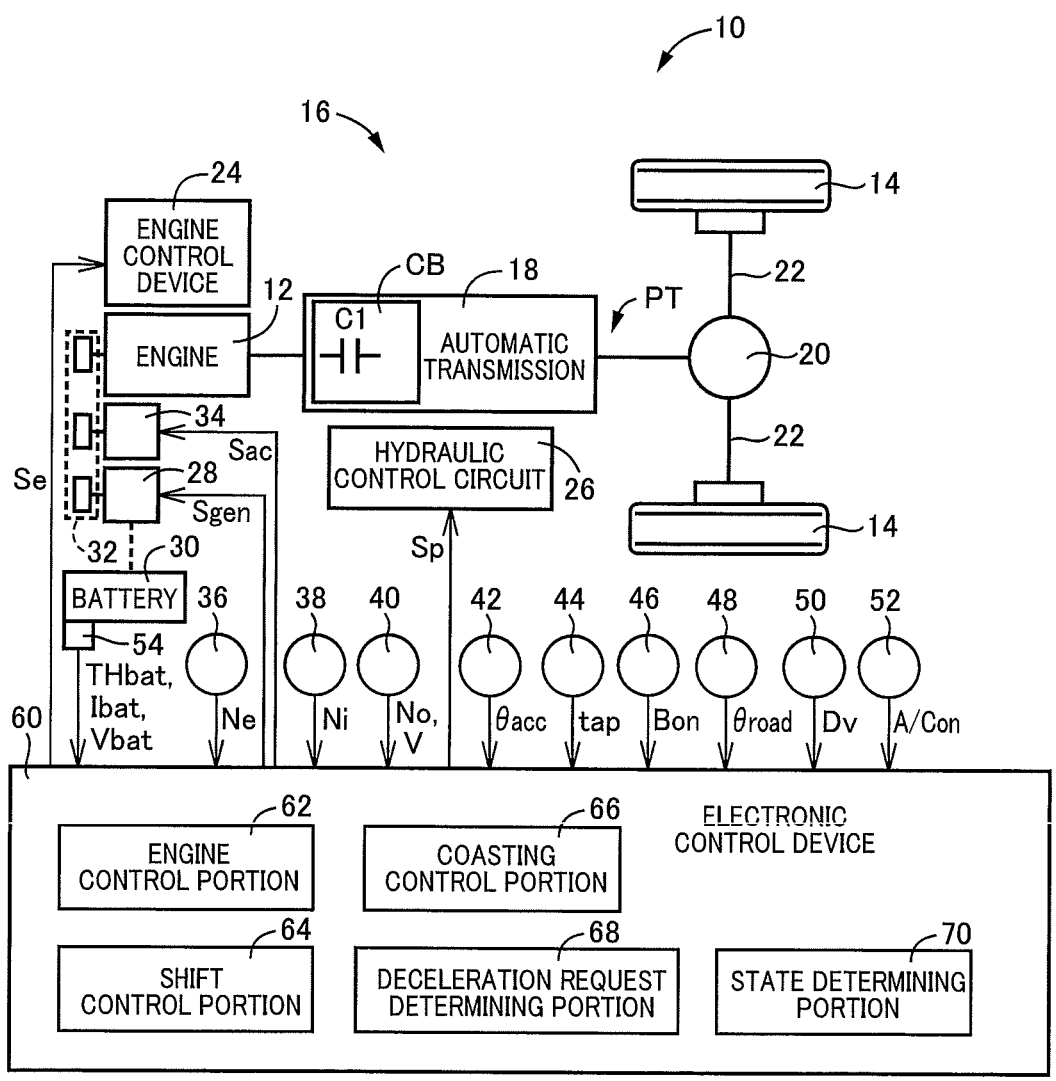
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control function and a control system for various controls in the vehicle 10. In FIG. 1, the vehicle 10 includes an engine 12 functioning as a drive power source, drive wheels 14, and a vehicle power transmission device 16 disposed in a power transmission path PT between the engine 12 and the drive wheels 14. The vehicle power transmission device 16 will hereinafter be referred to as the power transmission device 16.

The power transmission device 16 includes an automatic transmission 18 coupled to the engine 12 directly or indirectly via a damper etc. not shown, a differential gear device 20 coupled to an output rotating member of the automatic transmission 18, left and right axles 22 coupled to the differential gear device 20, etc. In the power transmission device 16, power output from the engine 12 is transmitted sequentially through the automatic transmission 18, the differential gear device 20, the axles 22, etc. to the left and right drive wheels 14. The power is synonymous with torque and force if not particularly distinguished.

The engine 12 includes an engine control device 24 having various devices necessary for an output control of the engine 12, such as an electronic throttle device, a fuel injection device, and an ignition device. In the engine 12, an output torque of the engine 12, i.e., an engine torque Te, is controlled by an electronic control device 60 described later through control of the engine control device 24 depending on an accelerator operation amount θacc that is an operation amount of an accelerator pedal corresponding to a drive request amount from a driver to the vehicle 10.

The automatic transmission 18 is a multi-speed transmission constituting a portion of the power transmission path PT between the engine 12 and the drive wheels 14. The automatic transmission 18 is, for example, a known planetary gear type automatic transmission including a plurality of planetary gear devices and a plurality of hydraulic friction engagement devices such as clutches and brakes. In this example, the plurality of friction engagement devices is referred to as engagement devices CB.

The engagement devices CB have respective torque capacities changed by regulated engagement hydraulic pressures output from solenoid valves etc. in a hydraulic control circuit 26 disposed in the vehicle 10 so that an operation state of each of the engagement devices CB is switched between engagement and release, etc. In the automatic transmission 18, one gear position is selectively formed out of a plurality of gear shift positions (also referred to as gear positions) in accordance with engagement of a predetermined engagement device included in the engagement devices CB. The gear shift positions are different in speed change ratio (also referred to as gear ratio) γ (=transmission input rotation speed Ni/transmission output rotation speed No) in accordance with engagement of a predetermined engagement device included in the engagement devices CB. In the automatic transmission 18, the operation state of each of the engagement devices CB is controlled by the electronic control device 60 in accordance with a driver's accelerator operation, a vehicle speed V, etc., so that the gear position to be formed is switched. When the engagement devices CB are all released, the automatic transmission 18 is brought into a neutral state in which no gear position is formed, i.e., power transmission is interrupted. A clutch C1 is one of the engagement devices CB and functions as an input clutch of the automatic transmission 18. The clutch C1 is disposed in the power transmission path PT between the engine 12 and the drive wheels 14 and functions as an engagement device selectively connecting and disconnecting the power transmission path PT. Connecting and disconnecting the power transmission path PT mean enabling or interrupting power transmission through the power transmission path PT, respectively. The automatic transmission 18 is brought into the neutral state by releasing the clutch C1. For the automatic transmission 18, a known belt type continuously variable transmission etc. may be used instead of the multi-speed transmission.

The vehicle 10 further includes an alternator 28 serving as a generator operatively coupled to the engine 12, a battery 30 storing an electric power generated by the alternator 28, and an auxiliary machine operatively coupled to the engine 12. The alternator 28 is coupled to the engine 12 via a belt 32, for example, and is driven by rotation of the engine 12. The auxiliary machine is, for example, an air conditioner compressor 34 coupled to the engine 12 via the belt 32, an electromagnetic clutch not shown, etc. The compressor 34 is driven by rotation of the engine 12.

The vehicle 10 includes the electronic control device 60 as a controller including a control device of the vehicle 10 related to control of the engine 12, the automatic transmission 18, etc. The electronic control device 60 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 60 is configured separately for an engine control, a shift control, etc. as needed.

The electronic control device 60 is supplied with various signals (e.g., an engine rotation speed Ne that is a rotation speed of the engine 12, the transmission input rotation speed Ni that is an input rotation speed of the automatic transmission 18, the transmission output rotation speed No that is an output rotation speed of the automatic transmission 18 corresponding to the vehicle speed V, an accelerator operation amount θacc representative of a magnitude of a driver's accelerating operation, a throttle opening degree tap, a brake-on Bon that is a signal indicative of a state in which a brake operation member for actuating a wheel brake is operated by the driver, a road gradient θroad that is a gradient of a running road, an inter-vehicle distance Dv that is a distance between the vehicle 10 and a immediately preceding vehicle, an air conditioner-on A/Con that is a signal indicative of a state in which the compressor 34 is operating, a battery temperature THbat that is a temperature of the battery 30, a battery charge/discharge current Ibat that is an input/output current of the battery 30, and a battery voltage Vbat which is a voltage of the battery 30) based on detection values from various sensors etc. included in the vehicle 10 (e.g., an engine rotation speed sensor 36, an input rotation speed sensor 38, an output rotation speed sensor 40, an accelerator operation amount sensor 42, a throttle opening degree sensor 44, a brake switch 46, a road gradient sensor 48, an inter-vehicle distance sensor 50, an air conditioner switch 52 for driving the air conditioner, and a battery sensor 54, respectively). The electronic control device 60 calculates a state-of-charge value SOC [%] as a value indicative of a state of charge of the battery 30 based on the battery charge/discharge current Ibat and the battery voltage Vbat, for example. The state-of-charge value SOC is a value indicative of a capacity of the battery 30 that is remaining, i.e., a remaining capacity of the battery 30.

The electronic control device 60 outputs to devices included in the vehicle 10 (e.g., the engine control device 24, the hydraulic control circuit 26, the alternator 28, and the compressor 34) various command signals (e.g., an engine control command signal Se for controlling the engine 12, a hydraulic control command signal Sp for controlling the operation state of the engagement device CB, an electric-power-generation voltage command signal Sgen for controlling an electric power generation state of the alternator 28, and an air conditioner control command signal Sac for driving the compressor 34 and controlling a capacity of the compressor 34).

To implement various controls in the vehicle 10, the electronic control device 60 includes an engine control means, i.e., an engine control portion 62, a shift control means, i.e., a shift control portion 64, and a coasting control means, i.e., a coasting control portion 66.

The engine control portion 62 controls the engine control device 24 such that a requested amount of the engine torque Te is acquired. For example, the engine control portion 62 applies the accelerator operation amount θacc and the vehicle speed V to a relationship obtained empirically or through design and stored in advance, i.e., a predefined relationship, for example, a drive torque map, to calculate a required drive torque Tdem as a drive request amount. The engine control portion 62 sets a target engine torque Tet at which the required drive torque Tdem is achieved in consideration of the gear position of the automatic transmission 18, and outputs to the engine control device 24 the engine control command signal Se for controlling the engine 12 such that the target engine torque Tet is acquired.

The shift control portion 64 provides the shift control of the automatic transmission 18. For example, the shift control portion 64 makes determination on a shift of the automatic transmission 18 by using a predetermined relationship, for example, a shift map, to provide the shift control of the automatic transmission 18 as needed. In this shift control of the automatic transmission 18, the shift control portion 64 outputs to the hydraulic control circuit 26 the hydraulic control command signal Sp for switching the operation state of each of the engagement devices CB so as to automatically switch the gear position of the automatic transmission 18. The shift map is a predetermined relationship having shift lines for determining the shift of the automatic transmission 18 on two-dimensional coordinates having the transmission output rotation speed No and the accelerator operation amount θacc as variables, for example. The vehicle speed V etc. may be used instead of the transmission output rotation speed No, and the required drive torque Tdem, the throttle opening degree tap, etc. may be used instead of the accelerator operation amount θacc. The shift lines in the shift map are an upshift line for determining an upshift of the automatic transmission 18 and a downshift line for determining a downshift of the automatic transmission 18.

The coasting control portion 66 provides a first coasting control for allowing the vehicle 10 to coast with the engine 12 brought into a drive state while the power transmission path PT between the engine 12 and the drive wheels 14 is disconnected by releasing the clutch C1, i.e., while the automatic transmission 18 is brought into the neutral state. Additionally, the coasting control portion 66 provides a second coasting control for allowing the vehicle 10 to coast with the engine 12 brought into a stop state while the power transmission path PT between the engine 12 and the drive wheels 14 is connected. The coasting control portion 66 can selectively provide the first coasting control and the second coasting control. Allowing the vehicle 10 to coast means allowing the vehicle 10 to perform coasting running.

When the first coasting control is provided, the coasting control portion 66 controls the engine 12 into an idling state, for example, and thereby brings the engine 12 into the drive state. The release of the clutch C1 in the first coasting control may be complete release making an engagement hydraulic pressure of the clutch C1 substantially zero, for example, or may be an engagement standby state in which a predetermined engagement hydraulic pressure is supplied to the clutch C1 to the extent that no torque capacity is generated, in consideration of responsiveness of acceleration after canceling the first coasting control. In this example, the first coasting control is referred to as an idle coasting control.

When the second coasting control is provided, the coasting control portion 66 outputs to the engine control portion 62 a command to perform fuel cut for stopping fuel supply to the engine 12 and thereby brings the engine 12 into the stop state. The stop state of the engine 12 in this case is the stop of operation of the engine 12 and is not the stop of rotation of the engine 12. In the second coasting control, the coasting control portion 66 can provide a regenerative control through electric power generation of the alternator 28. When the second coasting control is provided, for example, the coasting control portion 66 outputs the electric-power-generation voltage command signal Sgen to the alternator 28 for performing the electric power generation of the alternator 28 at a predefined maximum electric-power-generation voltage Valtmax so as to provide this regenerative control. In this example, the second coasting control with an electric-power-generation voltage Valt of the alternator 28 set to the maximum electric-power-generation voltage Valtmax, i.e., the second coasting control accompanying the regenerative control performed with the alternator 28 generating an electric power at the maximum electric-power-generation voltage Valtmax, is referred to as an engine-brake coasting control.

If a predetermined coasting start condition A is satisfied during running of the vehicle 10, the coasting control portion 66 provides one of the first coasting control and the second coasting control. The predetermined coasting start condition A is a predefined condition for determining the provision of the coasting control, such as switching from an accelerator-on state to an accelerator-off state, for example. The accelerator-off state corresponds to a state where it is determined that the accelerator operation amount θacc is zero.

In the idle coasting control, the engine 12 is disconnected from the drive wheels 14 during coasting, so that engine brake torque is not applied. On the other hand, in the engine-brake coasting control, a load torque etc. associated with the electric power generation of the alternator 28 are applied through the regenerative control in addition to the engine brake torque. Therefore, the idle coasting control has the deceleration of the vehicle 10 made smaller as compared to the engine-brake coasting control, and therefore, when a request for the deceleration is small, the idle coasting control is desirably provided. In this example, the request for the deceleration of the vehicle 10 is referred to as a deceleration request.

If the electric power generation of the alternator 28 in the regenerative control is suppressed in the second coasting control, the load torque associated with the electric power generation of the alternator 28 is suppressed, so that the deceleration of the vehicle 10 is made smaller as compared to the engine-brake coasting control. Therefore, it is conceivable that the second coasting control with the suppressed electric power generation of the alternator 28 is provided if the deceleration request is small. In the second coasting control, the coasting control portion 66 can suppress the electric power generation of the alternator 28 as compared to the electric power generation performed with the alternator 28 at the maximum electric-power-generation voltage Valtmax. Therefore, the coasting control portion 66 can perform the second coasting control with the suppressed electric power generation of the alternator 28. In this example, the second coasting control with the suppressed electric power generation of the alternator 28 is referred to as an alternator electric-power-generation-suppressed coasting control or an electric-power-generation-suppressed coasting control. In both the idle coasting control and the electric-power-generation-suppressed coasting control, the deceleration of the vehicle 10 is made smaller as compared to the engine-brake coasting control, and therefore, in this example, the idle coasting control and the electric-power-generation-suppressed coasting control are referred to as a deceleration-reduced coasting control.

The coasting control portion 66 outputs the electric-power-generation voltage command signal Sgen for setting an electric power generation amount of the alternator 28 to zero and thereby suppresses the electric power generation of the alternator 28. Alternatively, the coasting control portion 66 outputs the electric-power-generation voltage command signal Sgen for performing constant-voltage electric power generation in which the electric-power-generation voltage Valt of the alternator 28 is maintained constant at a predetermined voltage Valtf, and thereby suppresses the electric power generation of the alternator 28. The electric-power-generation-suppressed coasting control is basically provided as an electric-power-generation zero control of the alternator 28 that is a control of setting the electric power generation amount of the alternator 28 to zero, i.e., a control of making the alternator 28 non-regenerative. However, as described later, in the case of the low state-of-charge value SOC etc., the electric-power-generation-suppressed coasting control is provided as a constant voltage control of the alternator 28 that is a control for performing the constant voltage electric power generation of the alternator 28. The predetermined voltage Valtf is a voltage lower than the maximum electric-power-generation voltage Valtmax and is the predefined electric-power-generation voltage Valt for performing the electric power generation of the alternator 28 such that a fluctuation of the battery voltage Vbat is suppressed or that the battery voltage Vbat is maintained constant, for example. The constant voltage control of the alternator 28 is different from the regenerative control at the maximum electric-power-generation voltage Valtmax and is not a control for actively charging the battery 30.

Figure 2:
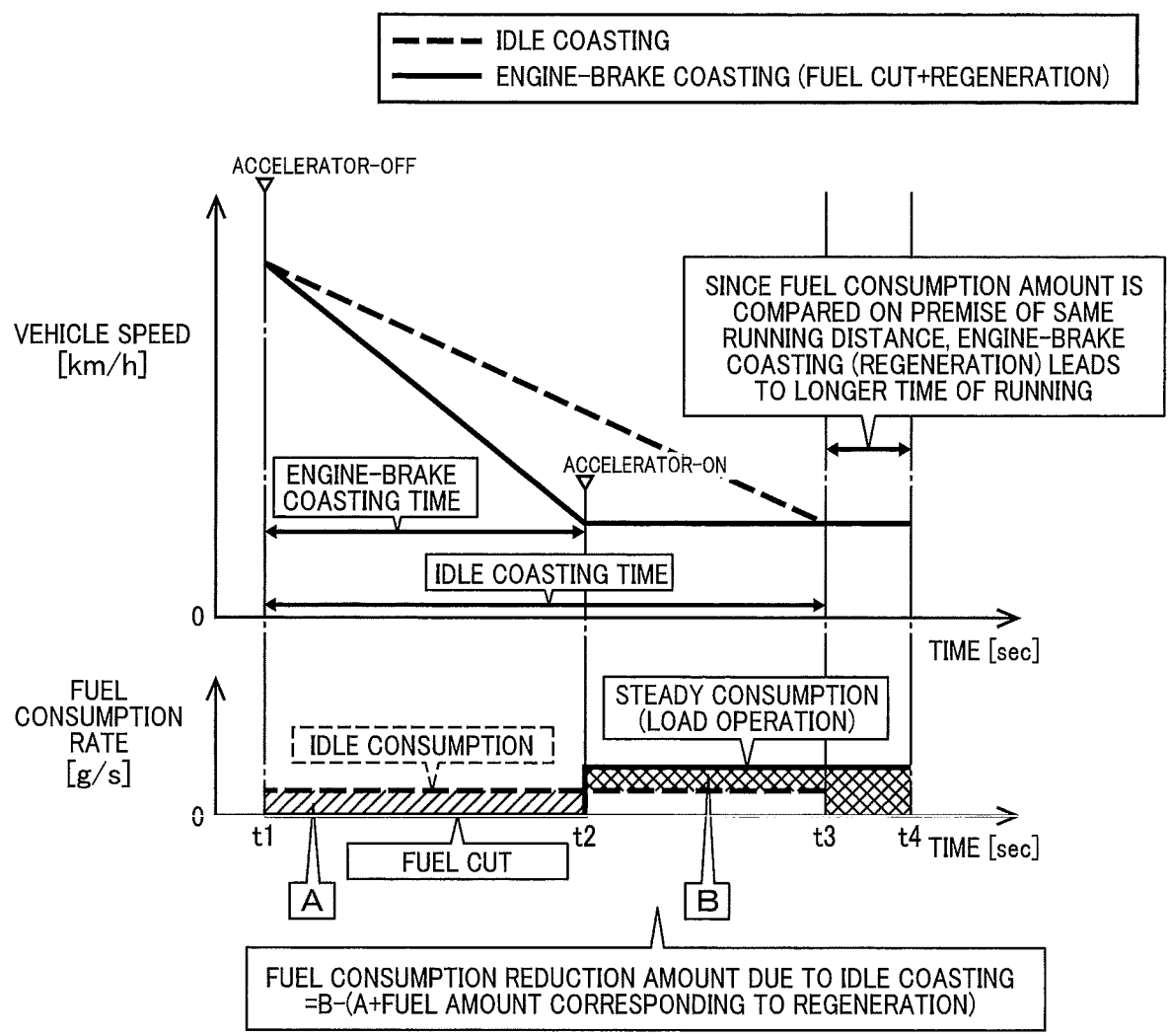
FIG. 2 is a diagram for explaining how fuel efficiency is improved through an idle coasting control.

FIG. 2 is a diagram for explaining how fuel efficiency is improved through the idle coasting control. In FIG. 2, time t1 indicates a time point when the predetermined coasting start condition A is satisfied due to the accelerator-off state etc. In the idle coasting control indicated by a broken line, the deceleration is smaller than the engine-brake coasting control indicated by a solid line, and therefore, the vehicle speed V is more slowly reduced so that a coasting time is made longer (see time t1 to time t3). In this idle coasting control, the fuel is consumed for controlling the engine 12 to the idling state. On the other hand, in the engine-brake coasting control, fuel consumption is made zero by the fuel cut during a coasting time (see time t1 to t2); however, the vehicle 10 must run for a longer time than the idle coasting control so as to make a running distance the same as in the idle coasting control, and the fuel is consumed for a load operation of the engine 12 after cancellation of the engine-brake coasting control (see time t2 to time t4). A fuel consumption amount reduced by the idle coasting control as compared to the engine-brake coasting control, i.e., a fuel consumption reduction amount Cidl due to the idle coasting control, is expressed by Eq. (1) below. In Eq. (1) below, "A" denotes a fuel consumption amount corresponding to an area of a hatched portion A of FIG. 2, i.e., an amount of fuel consumed in the idle coasting control during the coasting time of the engine-brake coasting control. A "fuel amount corresponding to regeneration" is an amount of fuel required for the alternator 28 to generate from the power of the engine 12 an electric power corresponding to an amount of the electric power generated by the alternator 28 in the regenerative control in the engine-brake coasting control, which is not stored in the battery 30 in the case of the idle coasting control. "B" denotes a fuel consumption amount corresponding to an area of a shaded portion B of FIG. 2, i.e., an amount of the fuel required in the engine-brake coasting control as compared to the idle coasting control after cancellation of the engine-brake coasting control for making the running distance the same as in the idle coasting control.

$$Cidl = B - (A + \text{fuel amount corresponding to regeneration}) \quad (1)$$

Figure 3:
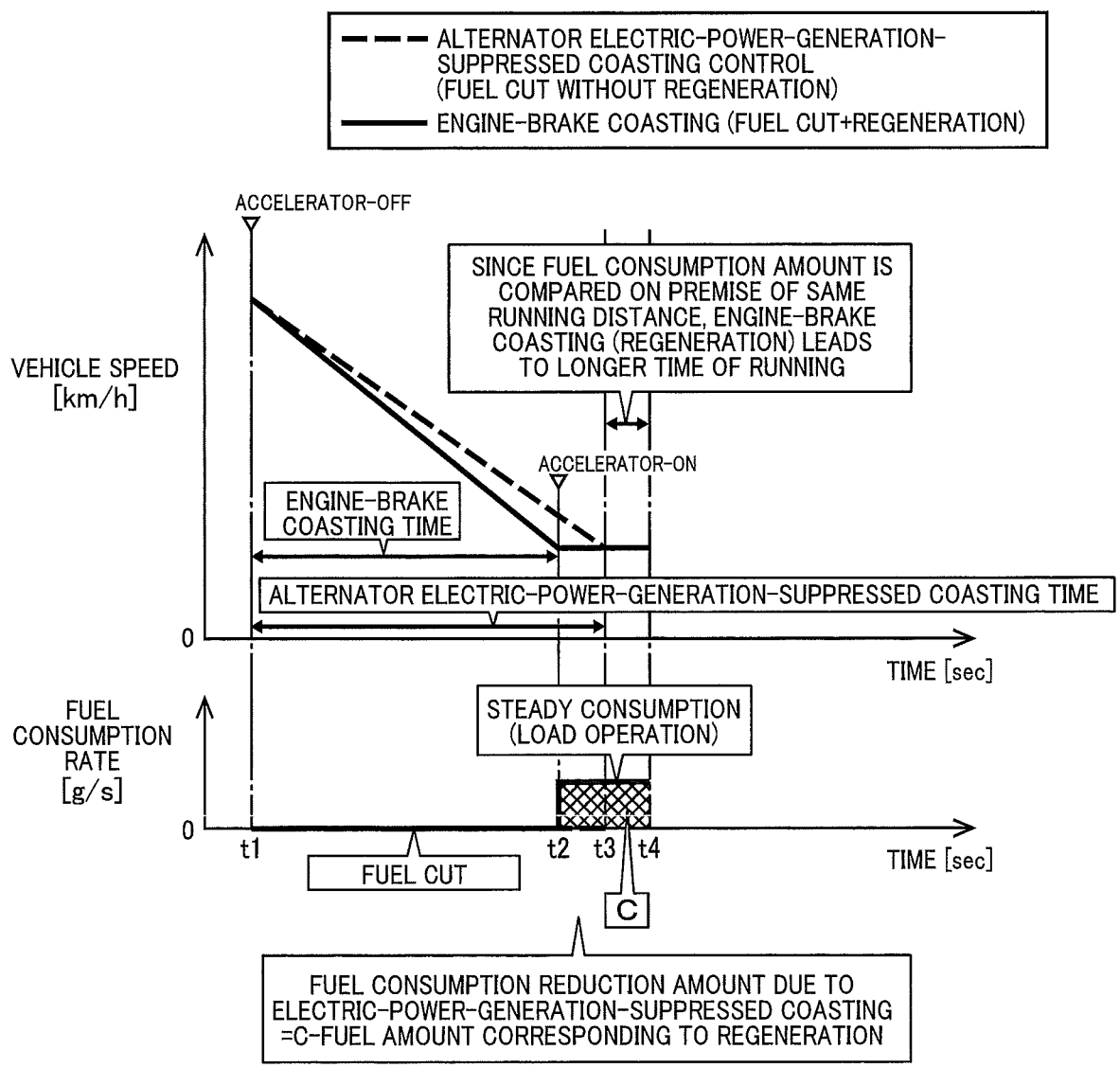
FIG. 3 is a diagram for explaining how fuel efficiency is improved through an electric-power-generation-suppressed coasting control provided as an electric-power-generation zero control.

FIG. 3 is a diagram for explaining how fuel efficiency is improved through the electric-power-generation-suppressed coasting control provided as the electric-power-generation zero control. In FIG. 3, time t1 indicates a time point when the predetermined coasting start condition A is satisfied due to the accelerator-off state etc. In the electric-power-generation-suppressed coasting control indicated by a broken line, the deceleration is smaller than the engine-brake coasting control indicated by a solid line, and therefore, the vehicle speed V is more slowly reduced so that a coasting time is made longer (see time t1 to time t3). On the other hand, in the engine-brake coasting control, fuel consumption is made zero by the fuel cut during a coasting time (see time t1 to t2); however, the vehicle 10 must run for a longer time than the electric-power-generation-suppressed coasting control so as to make a running distance the same as in the electric-power-generation-suppressed coasting control, and the fuel is consumed for a load operation of the engine 12 after cancellation of the engine-brake coasting control (see time t2 to time t4). A fuel consumption amount reduced by the electric-power-generation-suppressed coasting control as compared to the engine-brake coasting control, i.e., a fuel consumption reduction amount Cres due to the electric-power-generation-suppressed coasting control, is expressed by Eq. (2) below. In Eq. (2) below, a "fuel amount corresponding to regeneration" is an amount of fuel required for the alternator 28 to generate from the power of the engine 12 an electric power corresponding to an amount of the electric power generated by the alternator 28 in the regenerative control in the engine-brake coasting control, which is not stored in the battery 30 in the case of the electric-power-generation-suppressed coasting control. "C" denotes a fuel consumption amount corresponding to an area of a shaded portion C of FIG. 3, i.e., an amount of the fuel required in the case of the engine-brake coasting control after cancellation of the engine-brake coasting control for making the running distance the same as in the electric-power-generation-suppressed coasting control.

$$Cres = C - \text{fuel amount corresponding to regeneration} \quad (2)$$

While the power transmission path PT between the engine 12 and the drive wheels 14 is connected, the deceleration of the vehicle 10 is changed in accordance with not only a friction torque of the engine 12 but also a load torque Tac accompanying the operation of the compressor 34 as a load of the compressor 34 and a load torque accompanying the operation of the alternator 28 as a load of the alternator 28. In this example, the load of the compressor 34 is referred to as a compressor load, and the load of the alternator 28 is referred to as an alternator load. If the compressor load is relatively low while the idle coasting control is not provided, the reduction amount of the deceleration of the vehicle 10 may be made smaller when the idle coasting control is provided by releasing the clutch C1, and therefore, the fuel efficiency improvement effect is made larger in the electric-power-generation-suppressed coasting control in which coasting is performed by fuel cut.

Figure 4:
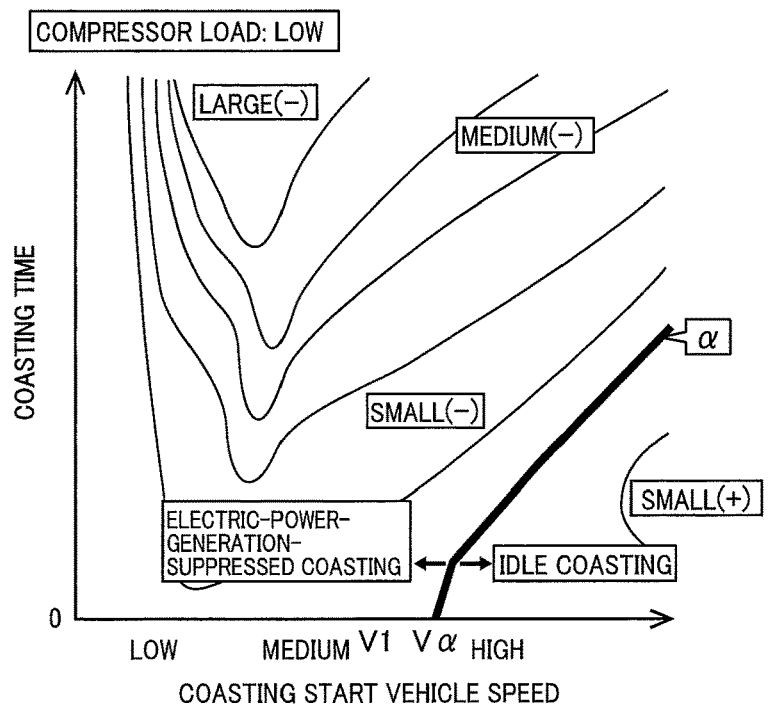
FIG. 4 is a diagram showing a tendency of a difference between a fuel consumption reduction amount due to the idle coasting control and a fuel consumption reduction amount due to the electric-power-generation-suppressed coasting control on a two-dimensional coordinate having a coasting start vehicle speed and a coasting time as variables.
Figure 5:
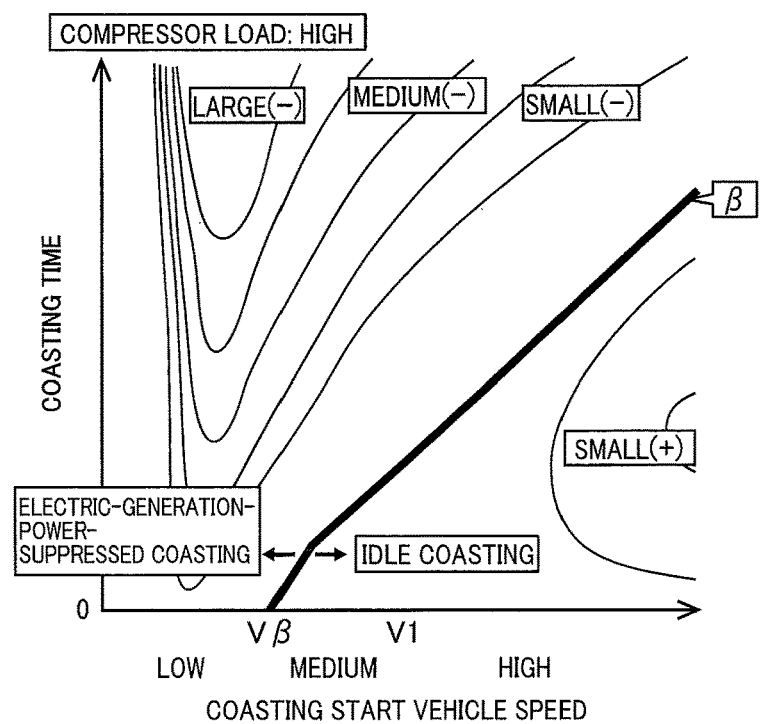
FIG. 5 is a diagram showing a tendency of the difference between the fuel consumption reduction amounts due to the idle coasting control and the electric-power-generation-suppressed coasting control on the two-dimensional coordinate.

FIGS. 4 and 5 are diagrams showing a tendency of a difference ΔC (=Cidl−Cres) between the fuel consumption reduction amount Cidl due to the idle coasting control and the fuel consumption reduction amount Cres due to the electric-power-generation-suppressed coasting control, respectively, on two-dimensional coordinates having a coasting start vehicle speed and a coasting time as variables, for example. FIG. 4 shows the case of relatively high compressor load, and FIG. 5 shows the case of relatively low compressor load. In FIGS. 4 and 5, the coasting start vehicle speed is the vehicle speed V when the provision of the deceleration-reduced coasting control is determined due to a small deceleration request, for example. "Small", "medium", and "large" indicate the tendency of the difference ΔC, and the absolute value of the difference ΔC is larger in the order of "small", "medium", and "large". A region of "idle coasting" on the high vehicle speed side of the coasting start vehicle speed relative to a solid line α or a solid line β is a region in which the difference ΔC has a positive value and is a region in which the idling coasting control has a larger fuel efficiency improvement effect than the electric-power-generation-suppressed coasting control. A region of "electric-power-generation-suppressed coasting" on the low vehicle speed side of the coasting start vehicle speed relative to the solid line α or the solid line β is a region in which the difference ΔC has a negative value and is a region in which the electric-power-generation-suppressed coasting control has a larger fuel efficiency improvement effect than the idling coasting control.

As shown in FIG. 4, if the compressor load is relatively low, the fuel efficiency improvement effect is increased by providing the idle coasting control in the high vehicle speed region of the coasting start vehicle speed and providing the electric-power-generation-suppressed coasting control in the low/medium vehicle speed region of the coasting start vehicle speed. As shown in FIG. 5, if the compressor load is relatively high, the fuel efficiency improvement effect is increased by providing the idle coasting control in the medium/high vehicle speed region of the coasting start vehicle speed and providing the electric-power-generation-suppressed coasting control in the low vehicle speed region of the coasting start vehicle speed. Therefore, for example, when the coasting start vehicle speed is V1 and the compressor load is relatively low, the electric-power-generation-suppressed coasting control is desirably provided (see FIG. 4). For example, when the coasting start vehicle speed is V1 and the compressor load is relatively high, the idle coasting control is desirably provided (see FIG. 5).

FIG. 6 is a diagram showing the coasting control suitable for each state of the compressor load and the coasting start vehicle speed. FIG. 6 is a table summarizing the coasting control suitable for each state based on the tendency of the difference ΔC as shown in FIGS. 4 and 5, for example. In FIG. 6, when the compressor load is relatively low or medium, the electric-power-generation-suppressed coasting control is provided in the medium vehicle speed region of the coasting start vehicle speed, and the idle coasting control is provided in the high vehicle speed region of the coasting start vehicle speed. When the compressor load is relatively high, the idle coasting control is provided in the medium/ high vehicle speed region of the coasting start vehicle speed. In the low vehicle speed region of the coasting start vehicle speed, the engine-brake coasting control is provided regardless of the magnitude of the compressor load. The engine-brake coasting control is provided in the low vehicle speed region of the coasting start vehicle speed also from the viewpoint that the coasting control making the deceleration smaller should not be provided while the vehicle 10 is coming to a stop. Therefore, in the low vehicle speed region of the coasting start vehicle speed, the deceleration-reduced coasting control may be once provided, and if the vehicle speed V further decreases, the engine-brake coasting control may be provided. When the compressor load is relatively low, as shown in FIG. 4, the high vehicle speed region of the coasting start vehicle speed defined as the region of "idle coasting" is relatively narrow, and the fuel efficiency improvement effect due to the idle coasting control is relatively small, so that the electric-power-generation-suppressed coasting control may be provided even in the high vehicle region of the coasting start vehicle speed.

Figure 7:
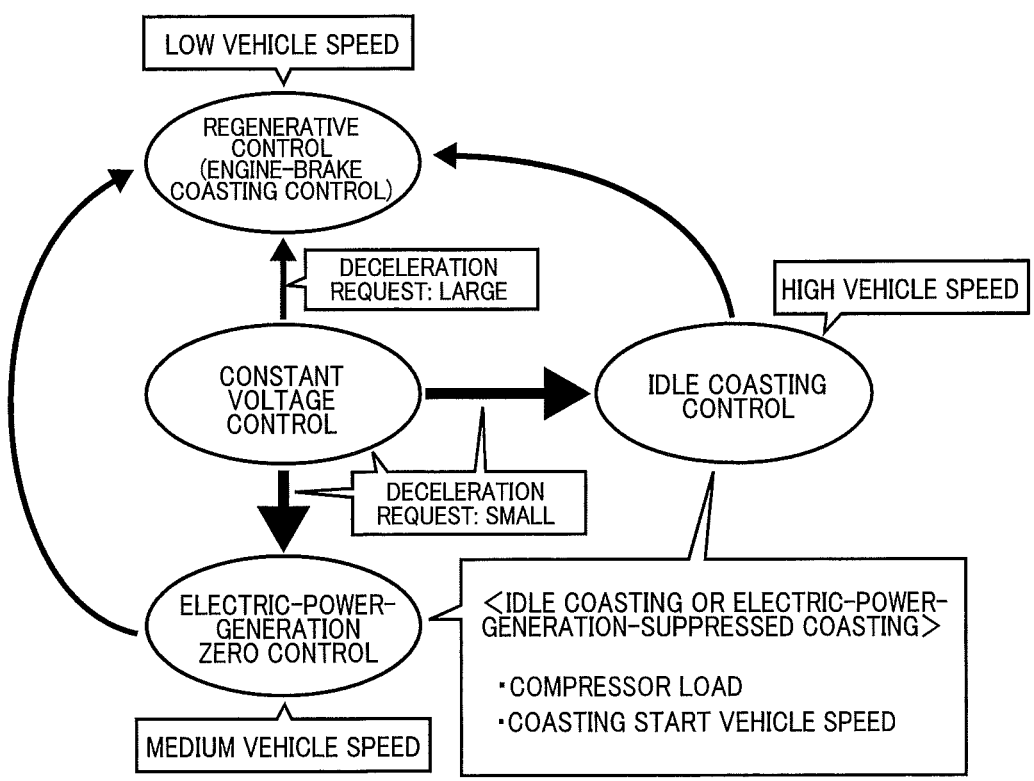
FIG. 7 is a transition diagram for explaining transition of coasting controls when a plurality of coasting controls is provided.

FIG. 7 is a transition diagram for explaining transition of coasting controls when a plurality of coasting controls is provided. In FIG. 7, when the deceleration request is small, the electric-power-generation-suppressed coasting control provided as the electric-power-generation zero control or the constant voltage control of the alternator 28, or the idle coasting control, is provided. On the other hand, when the deceleration request is large, the engine-brake coasting control is provided. In a general tendency, the engine-brake coasting control is provided in the low vehicle speed region, the electric-power-generation-suppressed coasting control is provided in the medium vehicle speed region, and the idle coasting control is provided in the high vehicle speed region. The electric-power-generation-suppressed coasting control and the idle coasting control are selectively provided depending on the compressor load and the coasting start vehicle speed. The electric-power-generation-suppressed coasting control is basically provided as the electric-power-generation zero control; however, in the case of the low state-of-charge value SOC etc., the electric-power-generation-suppressed coasting control is provided as the constant voltage control.

To implement the control function of suitably providing the coasting control as described above, the electronic control device 60 further includes a deceleration request determining means, i.e., a deceleration request determining portion 68, and a state determining means, i.e., a state determining portion 70.

When the predetermined coasting start condition A is satisfied, the deceleration request determining portion 68 determines whether the deceleration request is large or small. For example, the deceleration request determining portion 68 determines whether the deceleration request is small based on whether a predetermined deceleration request small condition B is satisfied. For example, the predetermined deceleration request small condition B is met by satisfying both conditions that the inter-vehicle distance Dv is equal to or greater than a predetermined inter-vehicle distance Dvf and that the vehicle 10 is in a brake-off state in which the brake-on Bon is not output. The predetermined deceleration request small condition B may additionally include that a change speed of the accelerator operation amount θacc is less than a predetermined change speed dθaccf at the time of switching from the accelerator-on state to the accelerator-off state. The predetermined deceleration request small condition B may additionally include that the vehicle 10 is running on an uphill road or a flat road or on a gentle downhill road with the road gradient θroad equal to or less than a predetermined gradient θroadf. The predetermined inter-vehicle distance Dvf, the predetermined change speed dθaccf, and the predetermined gradient θroadf are respective predefined threshold values for determining that the deceleration request is small.

If the deceleration request determining portion 68 determines that the deceleration request is small when the predetermined coasting start condition A is satisfied, the coasting control portion 66 provides the idle coasting control or the electric-power-generation-suppressed coasting control. If the deceleration request determining portion 68 determines that the deceleration request is large when the predetermined coasting start condition A is satisfied, the coasting control portion 66 provides the engine-brake coasting control.

The state determining portion 70 calculates the load torque Tac due to the compressor 34 as the compressor load based on the air conditioner-on A/Con, the air conditioner control command signal Sac, etc. When the air conditioner-on A/Con is output, the state determining portion 70 calculates an operating capacity of the compressor 34 by applying the air-conditioner control command signal Sac to a predefined relationship, for example, and calculates the load torque Tac due to the compressor 34 by applying the operating capacity of the compressor 34 etc. to a predetermined relationship. When the air conditioner-on A/Con is not output, the state determining portion 70 sets the load torque Tac due to the compressor 34 to substantially zero.

If the deceleration request determining portion 68 determines that the deceleration request is small, the state determining portion 70 determines whether the compressor load is high, based on whether the calculated load torque Tac due to the compressor 34 is equal to or greater than a predetermined load Tacf. The predetermined load Tacf is a predefined lower limit value for determining that the compressor load is not in a low region in which the fuel efficiency improvement effect is more easily acquired from the electric-power-generation-suppressed coasting control as compared to the idle coasting control when the deceleration request is small, for example. When the compressor load is high, a reduction amount of the deceleration is large at the time of shifting to the idle coasting control.

If the deceleration request determining portion 68 determines that the deceleration request is small, the state determining portion 70 determines whether the vehicle speed V is a high vehicle speed equal to or greater than a predetermined vehicle speed Vf. The vehicle speed V in this case is the coasting start vehicle speed, for example. The predetermined vehicle speed Vf is a predefined lower limit value for determining that the vehicle speed V is in a high vehicle speed region in which the fuel efficiency improvement effect is more easily acquired from the idle coasting control as compared to the electric-power-generation-suppressed coasting control, for example, and is a threshold value determined depending on the magnitude of the compressor load. Specifically, the predetermined vehicle speed Vf is Vα that is a value of the coasting start vehicle speed at the coasting time of zero on the solid line α shown in FIG. 4, Vβ that is a value of the coasting start vehicle speed at the coasting time of zero on the solid line β shown in FIG. 5, etc.

If the state determining portion 70 determines that the load torque Tac due to the compressor 34 is equal to or greater than the predetermined load Tacf and that the vehicle speed V is equal to or greater than the predetermined vehicle speed Vf when the predetermined coasting start condition A is satisfied, the coasting control portion 66 provides the idle coasting control. If the state determining portion 70 determines that the load torque Tac due to the compressor 34 is less than the predetermined load Tacf and/or that the vehicle speed V is less than the predetermined vehicle speed Vf, when the predetermined coasting start condition A is satisfied, the coasting control portion 66 provides the electric-power-generation-suppressed coasting control. When the coasting control portion 66 provides the electric-power-generation-suppressed coasting control, the coasting control portion 66 requests the electric-power-generation zero control of the alternator 28.

If the electric-power-generation zero control of the alternator 28 is requested by the coasting control portion 66, the state determining portion 70 determines whether the electric-power-generation zero control is available based on whether a fluctuation of the battery voltage Vbat is permitted. For example, during lighting of halogen headlamps, during operation of wipers, etc., the state determining portion 70 determines that the fluctuation of the battery voltage Vbat is not permitted, i.e., the electric-power-generation zero control is not available. When the electric-power-generation zero control is not available, the provision of the electric-power-generation zero control is prohibited.

If the electric-power-generation zero control of the alternator 28 is requested by the coasting control portion 66, the state determining portion 70 determines whether the electric-power-generation zero control is available based on whether the state-of-charge value SOC is equal to or greater than a predetermined capacity SOCf. Determining whether the state-of-charge value SOC is equal to or greater than the predetermined capacity SOCf corresponds to determining whether the remaining capacity of the battery 30 is high. The predetermined capacity SOCf is a predefined lower limit value for determining whether the capacity of the battery 30 is remaining to the extent that the state-of-charge value SOC is allowed to decrease or whether the state-of-charge value SOC is high so that the charging of the battery 30 is not required.

If the state determining portion 70 determines that the fluctuation of the battery voltage Vbat is permitted and that the state-of-charge value SOC is equal to or greater than the predetermined capacity SOCf, the coasting control portion 66 provides the electric-power-generation-suppressed coasting control as the electric-power-generation zero control of the alternator 28. If the state determining portion 70 determines that the fluctuation of the battery voltage Vbat is not permitted, the coasting control portion 66 provides the electric-power-generation-suppressed coasting control as the constant voltage control of the alternator 28. If the state determining portion 70 determines that the state-of-charge value SOC is less than the predetermined capacity SOCf, the coasting control portion 66 provides the electric-power-generation-suppressed coasting control as the constant voltage control of the alternator 28.

The state determining portion 70 determines whether a return from the deceleration-reduced coasting control is required during provision of the deceleration-reduced coasting control by the coasting control portion, i.e., one of the idle coasting control and the electric-power-generation-suppressed coasting control. For example, the state determining portion 70 determines whether a return from the deceleration-reduced coasting control is required based on whether a predetermined reduced coasting return condition C is satisfied. For example, the reduced coasting return condition C is met by satisfying at least any one of the conditions that the current vehicle speed V is a low vehicle speed less than a second predetermined vehicle speed Vf2, that the inter-vehicle distance Dv is less than the predetermined inter-vehicle distance Dvf, that the vehicle 10 is in a brake-on state in which the brake-on Bon is output, and that the vehicle 10 is running on a steep downhill road with the road gradient θroad exceeding the predetermined gradient θroadf. The second predetermined vehicle speed Vf2 is, for example, the vehicle speed V lower than the predetermined vehicle speed Vf and is a predefined threshold value for determining that the deceleration request becomes larger.

If the state determining portion 70 determines that a return from the deceleration-reduced coasting control is required, for example, that the vehicle speed V becomes less than the second predetermined vehicle speed Vf2, during provision of one of the idle coasting control and the electric-power-generation-suppressed coasting control, the coasting control portion 66 shifts the control to the engine-brake coasting control.

Figure 8:
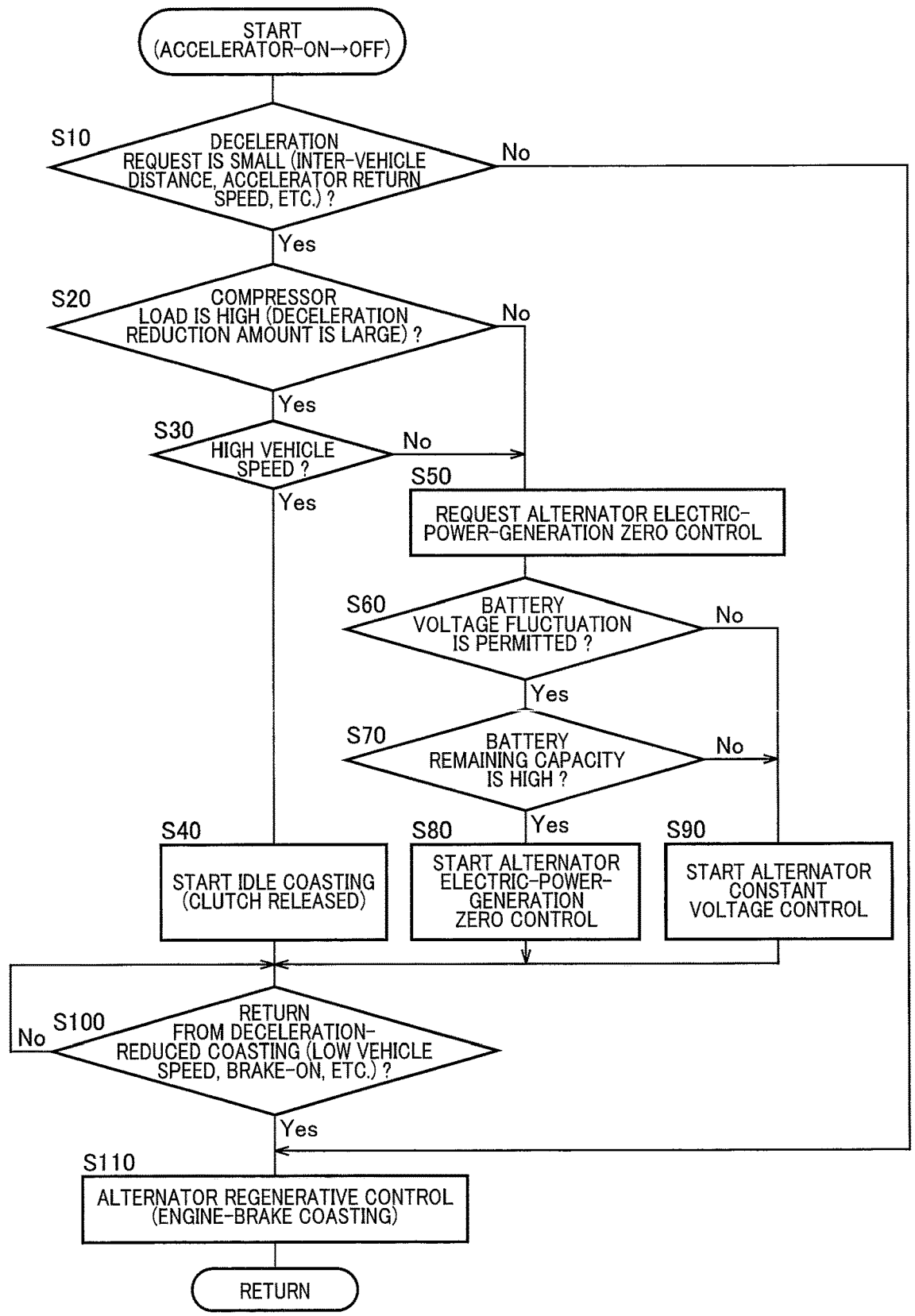
FIG. 8 is a flowchart for explaining a main portion of the control operation of an electronic control device, i.e., the control operation for providing the coasting control having a larger fuel efficiency improvement effect.

FIG. 8 is a flowchart for explaining a main portion of the control operation of the electronic control device 60, i.e., the control operation for providing the coasting control having a larger fuel efficiency improvement effect, and is executed when the predetermined coasting start condition A such as switching from the accelerator-on state to the accelerator-off state is satisfied, for example.

In FIG. 8, first, at step (hereinafter, step is omitted) S10 corresponding to the function of the deceleration request determining portion 68, it is determined whether the deceleration request is small based on the inter-vehicle distance Dv, the change speed of the accelerator operation amount θacc at the time of switching to the accelerator-off state, etc. If the determination of S10 is affirmative, it is determined whether the compressor load is relatively high at S20 corresponding to the function of the state determining portion 70. If the determination of S20 is affirmative, it is determined whether the vehicle speed V is high vehicle speed at S30 corresponding to the function of the state determining portion 70. If the determination of S30 is affirmative, the idle coasting control is started at S40 corresponding to the function of the coasting control portion 66. If the determination of S20 is negative or the determination of S30 is negative, at S50 corresponding to the function of the coasting control portion 66, the electric-power-generation zero control of the alternator 28 is requested when the electric-power-generation-suppressed coasting control is provided. Subsequently, at S60 corresponding to the function of the state determining portion 70, it is determined whether a fluctuation of the battery voltage Vbat is permitted. If the determination of S60 is affirmative, it is determined whether the remaining capacity of the battery 30 is high at S70 corresponding to the function of the state determining portion 70. When the determination of S70 is affirmative, the electric-power-generation-suppressed coasting control is started as the electric-power-generation zero control of the alternator 28 at S80 corresponding to the function of the coasting control portion 66. If the determination of S60 is negative or the determination of S70 is negative, the electric-power-generation-suppressed coasting control is started as the constant voltage control of the alternator 28 at S90 corresponding to the function of the coasting control portion 66. After S40, S80, or S90, it is determined at S100 corresponding to the function of the state determining portion 70 whether a return from the deceleration-reduced coasting control is required based on whether the vehicle speed V is low vehicle speed or whether the vehicle 10 is in the brake-on state. If the determination of S100 is negative, S100 is repeatedly executed. If the determination of S10 is negative or the determination of S100 is affirmative, at S110 corresponding to the function of the coasting control portion 66, the engine-brake coasting control accompanied with the regenerative control by the alternator 28 is provided at the maximum electric-power-generation voltage Valtmax.

Figure 9:
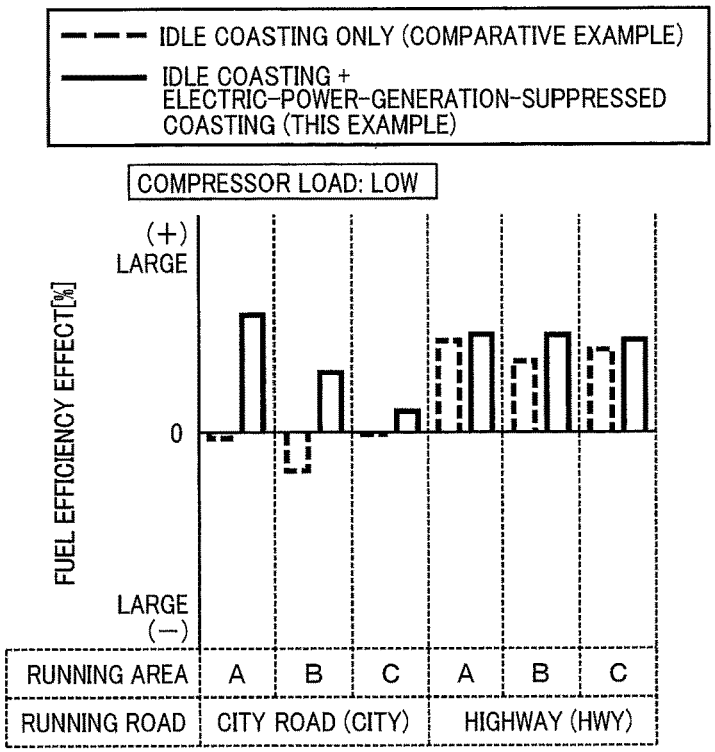
FIG. 9 is a diagram showing a result of verification of the fuel efficiency improvement effect in the present example.
Figure 10:
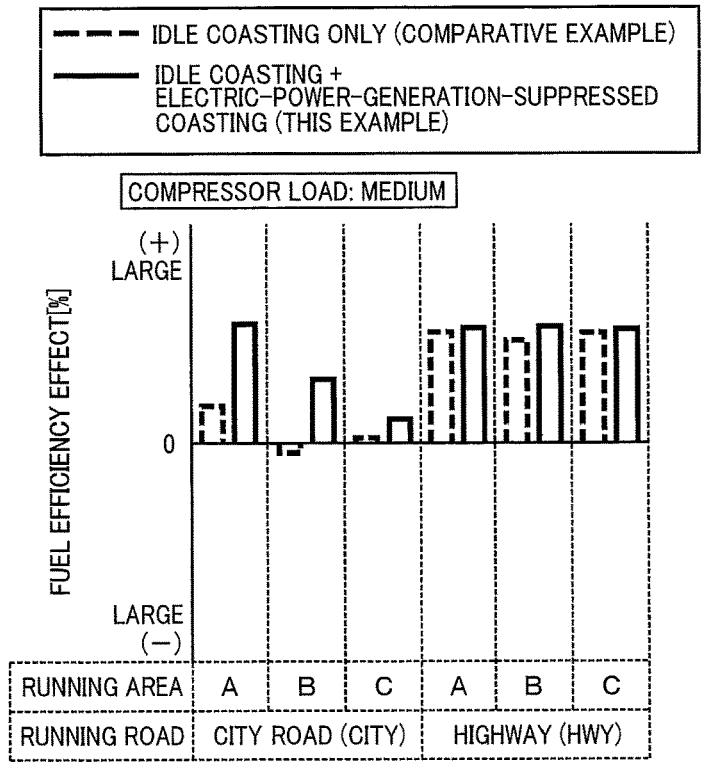
FIG. 10 is a diagram showing a result of verification of the fuel efficiency improvement effect in the present example.

FIGS. 9, 10, and 11 are diagrams respectively showing results of verification of the fuel efficiency improvement effect obtained from actual running of a vehicle having the function of the vehicle 10. FIG. 9 shows the case of the relatively low compressor load, FIG. 10 shows the case of the medium compressor load, and FIG. 11 shows the case of the relatively high compressor load. In FIGS. 9, 10, and 11, "fuel efficiency effect" is a comparison with the case of providing only the engine-brake coasting control as the coasting control, and a larger value on the positive value (+) side indicates a larger fuel efficiency improvement effect. The negative value (−) side of the "fuel efficiency effect" indicates deterioration in the fuel efficiency. A solid line shows the fuel efficiency effect in this example in which the idle coasting control and the electric-power-generation-suppressed coasting control are provided as the coasting control in addition to the engine-brake coasting control. A broken line shows the fuel efficiency effect in a comparative example in which only the idle coasting control is provided as the coasting control in addition to the engine-brake coasting control. "A", "B", and "C" of "running area" indicate that the vehicle ran in the same respective areas for "A", "B", and "C". In FIGS. 9, 10, and 11, in the comparative example, when the compressor load is low to medium, the fuel efficiency improvement effect is small in running on city roads, or fuel consumption deteriorates depending on a running area. In contrast, in this example, even when the compressor load is low to medium, the fuel efficiency improvement effect is large in running on city roads, and the deterioration in fuel consumption is avoided. As described above, in this example, the fuel efficiency is significantly improved in running on city roads in the case of the low to medium compressor load.

As described above, according to the example, if the compressor load Tac is equal to or greater than the predetermined load Tacf and the vehicle speed V is equal to or greater than the predetermined vehicle speed Vf when the predetermined coasting start condition A is satisfied, the idle coasting control is provided, so that the large fuel efficiency improvement effect can be expected from the provision of the idle coasting control. In other words, when the compressor load is high, a large reduction amount of the deceleration of the vehicle 10 can be expected from disconnection of the power transmission path PT between the engine 12 and the drive wheels 14. If the vehicle speed V is high and the reduction amount of the deceleration is large, a long coasting running distance of the vehicle 10 can be expected. From the above, the large fuel efficiency improvement effect can be expected from the provision of the idle coasting control. Therefore, the coasting control having the larger fuel efficiency improvement effect can be provided.

According to this example, if the vehicle 10 has at least one of the compressor load Tac less than the predetermined load Tacf and the vehicle speed V less than the predetermined vehicle speed Vf when the predetermined coasting start condition A is satisfied, the electric-power-generation-suppressed coasting control is provided, so that the deceleration is reduced and the fuel efficiency improvement effect can be expected in the region where the fuel efficiency improvement effect is less expected from the provision of the idle coasting control. Therefore, the coasting control having the larger fuel efficiency improvement effect can be provided.

According to this example, if the fluctuation of the battery voltage Vbat is permitted and the state-of-charge value SOC is equal to or greater than the predetermined capacity SOCf, the electric-power-generation-suppressed coasting control is provided as the electric-power-generation zero control of the alternator 28, and on the other hand, if the fluctuation of the battery voltage Vbat is not permitted or the state-of-charge value SOC is less than the predetermined capacity SOCf, the electric-power-generation-suppressed coasting control is provided as the constant voltage control of the alternator 28, so that the electric-power-generation-suppressed coasting control may properly be provided.

According to this example, if the vehicle speed V becomes less than the second predetermined vehicle speed Vf2 during the provision of one of the idle coasting control and the electric-power-generation-suppressed coasting control, the control is shifted to the engine-brake coasting control, so that the deceleration is properly increased in the low vehicle speed region where the deceleration request is expected to be larger.

According to this example, if it is determined that the deceleration request is small when the predetermined coasting start condition A is satisfied, the idle coasting control or the electric-power-generation-suppressed coasting control is provided, so that a discomfort feeling due to reduction in deceleration is hardly caused for a driver.

According to this example, if it is determined that the deceleration request is large when the predetermined coasting start condition A is satisfied, the engine-brake coasting control is provided, so that when the coasting control reducing the deceleration should not be provided, the coasting control resulting in a relatively large deceleration is properly provided.

According to this example, while the compressor load is not constant, the coasting control having the larger fuel efficiency improvement effect can be provided depending on the compressor load.

Although the example of the present invention has been described in detail with reference to the drawings, the present invention can also be applied in other forms.

For example, in the example, if the fluctuation of the battery voltage Vbat is permitted and the state-of-charge value SOC is equal to or greater than the predetermined capacity SOCf, the electric-power-generation-suppressed coasting control is provided as the electric-power-generation zero control of the alternator 28; however, the present invention is not limited to this form. For example, only one of S60 and S70 may be included in FIG. 8, so that the electric-power-generation-suppressed coasting control may be provided as the electric-power-generation zero control of the alternator 28 if the fluctuation of the battery voltage Vbat is permitted, or the electric-power-generation-suppressed coasting control may be provided as the electric-power-generation zero control of the alternator 28 if the state-of-charge value SOC is equal to or greater than the predetermined capacity SOCf. Even in this way, the electric-power-generation-suppressed coasting control may suitably be provided.

In the example, the electric-power-generation zero control and the constant voltage control of the alternator 28 are exemplified as the electric-power-generation-suppressed coasting control; however, the present invention is not limited to this form. For example, the electric-power-generation-suppressed coasting control may have only one type of the second coasting control in which the electric power generation by the alternator 28 is suppressed as compared to when the electric power is generated by the alternator 28 at the maximum electric-power-generation voltage Valtmax. In such a case, for example, S60, S70 etc. are not included in FIG. 8, and if the determination of S20 or S30 is negative, the electric-power-generation-suppressed coasting control is started.

In the example, the clutch C1 constituting a portion of the automatic transmission 18 is exemplified as the engagement device disconnecting the engine 12 and the drive wheels 14; however, the present invention is not limited to this form. For example, the clutch C1 may be disposed independently of the automatic transmission 18. Alternatively, for example, if the automatic transmission 18 is a belt-type continuously variable transmission, the clutch C1 is disposed independently of the continuously variable transmission, and the clutch C1 may be an engagement device included in the known forward/reverse switching device included in the vehicle together with the belt-type continuously variable transmission.

In the example, the alternator 28 is exemplified as the generator; however, the present invention is not limited to this form. For example, the generator may be any device driven by rotation of the engine 12 and may be a rotating machine, a motor, etc.

The above description is merely an embodiment and the present invention can be implemented in variously modified and improved forms based on the knowledge of those skilled in the art.

REFERENCE SIGNS LIST

10: vehicle
12: engine
14: drive wheel
28: alternator (generator)
30: battery
34: compressor (auxiliary machine)
60: electronic control device (control device)
66: coasting control portion
68: deceleration request determining portion
C1: clutch (engagement device)
PT: power transmission path

What is claimed is:

1. A control device of a vehicle including an engine, an auxiliary machine driven by rotation of the engine, and an engagement device selectively connecting and disconnecting a power transmission path between the engine and drive wheels, the control device comprising: a coasting control portion for selectively providing a first coasting control for allowing the vehicle to coast with the engine brought into a drive state while the power transmission path is disconnected by release of the engagement device, and a second coasting control for allowing the vehicle to coast with the engine brought into a stop state while the power transmission path is connected, wherein
if a load of the auxiliary machine is equal to or greater than a predetermined load and a vehicle speed is equal to or greater than a predetermined vehicle speed when a predetermined coasting start condition is satisfied, the coasting control portion provides the first coasting control.

2. The control device of the vehicle according to claim 1, wherein
the vehicle further includes a generator driven by rotation of the engine, wherein
the coasting control portion is configured to provide a regenerative control through electric power generation of the generator in the second coasting control, and wherein
when the vehicle has at least one of the load of the auxiliary machine less than the predetermined load and the vehicle speed less than the predetermined vehicle speed when the predetermined coasting start condition is satisfied, the coasting control portion provides the second coasting control and suppresses the electric power generation of the generator as compared to the electric power generation by the generator performed at a maximum electric-power-generation voltage.

3. The control device of the vehicle according to claim 2, wherein
the vehicle further includes a battery storing a generated electric power of the generator, wherein
the coasting control portion suppresses the electric power generation of the generator by setting an electric power generation amount of the generator to zero when a capacity of the battery is equal to or greater than a predetermined capacity, and suppresses the electric power generation of the generator by performing a constant-voltage electric power generation in which an electric-power-generation voltage of the generator is maintained constant at a predetermined voltage lower than the maximum electric-power-generation voltage when the capacity of the battery is less than the predetermined capacity.

4. The control device of the vehicle according to claim 2, wherein
the vehicle further includes a battery storing a generated electric power of the generator, wherein
the coasting control portion suppresses the electric power generation of the generator by setting an electric power generation amount of the generator to zero when a fluctuation in voltage of the battery is permitted, and suppresses the electric power generation of the generator by performing a constant-voltage electric power generation in which an electric-power-generation voltage of the generator is maintained constant at a predetermined voltage lower than the maximum electric-power-generation voltage when the fluctuation in voltage of the battery is not permitted.

5. The control device of the vehicle according to claim 2, wherein when the vehicle speed becomes less than a second predetermined vehicle speed lower than the predetermined vehicle speed during provision of one of the second coasting control with the electric power generation of the electric generator suppressed and the first coasting control, the coasting control portion shifts the control to the second coasting control with the electric-power-generation voltage of the generator set to the maximum electric-power-generation voltage.

6. The control device of the vehicle according to claim 2, further comprising a deceleration request determining portion determining whether a request for deceleration of the vehicle is large or small when the predetermined coasting start condition is satisfied, wherein
    when it is determined that the request for deceleration is small, the coasting control portion provides the first coasting control or the second coasting control with the electric power generation of the electric generator suppressed.

7. The control device of the vehicle according to claim 6, wherein
    if it is determined that the request for deceleration is large, the coasting control portion provides the second coasting control and provides the regenerative control at the maximum electric-power-generation voltage.

8. The control device of the vehicle according to claim 1, wherein the auxiliary machine is a compressor for an air conditioner.

\* \* \* \* \*